United States Patent [19]

McCormick et al.

[11] 4,182,579

[45] Jan. 8, 1980

[54] RETAINING RING

[75] Inventors: Harold E. McCormick; Roger L. Berkbigler, both of Ballwin, Mo.

[73] Assignee: Ramsey Corporation, Manchester, Mo.

[21] Appl. No.: 864,144

[22] Filed: Dec. 23, 1977

[51] Int. Cl.² .............................................. F16D 1/06
[52] U.S. Cl. ....................................... 403/326; 85/8.8
[58] Field of Search .......... 403/326, 261, 360, DIG. 6; 285/321; 85/8.8

[56] References Cited

U.S. PATENT DOCUMENTS

| | | | |
|---|---|---|---|
| 2,450,425 | 10/1948 | Frisby | 85/8.8 |
| 3,080,771 | 3/1963 | Baldwin | 85/8.8 X |
| 3,439,944 | 4/1969 | Leutenegger | 403/326 X |
| 3,822,953 | 7/1974 | Adelizzi | 403/358 X |
| 4,024,802 | 5/1977 | Koppa | 403/261 X |

FOREIGN PATENT DOCUMENTS

| | | | |
|---|---|---|---|
| 2508677 | 9/1976 | Fed. Rep. of Germany | 85/8.8 |
| 137832 | 10/1952 | Sweden | 85/8.8 |

Primary Examiner—Andrew V. Kundrat

[57] ABSTRACT

A retaining ring structure is adapted to be located in a circumferential groove in a first member and to engage a second member to restrain relative axial movement of said members under thrust loading. The retaining ring structure includes a ring portion of L-shaped cross section having a leg portion and a foot portion. The free end of the leg portion fits into the groove and the foot portion engages a surface of the member adjacent the groove. A surface of the leg portion is adapted to contact the sidewall of the groove and is undercut so as to avoid contact with the edge of the groove. One specific retaining ring structure includes a pair of sector ring portions in nested relation with the outer apex of the L-shape of one of the sector ring portions located at the inner apex of the L-shape of the other sector ring portion.

19 Claims, 8 Drawing Figures

4,182,579

RETAINING RING

BACKGROUND AND SUMMARY OF THE INVENTION

The present invention relates to a retaining ring structure. The retaining ring structure of the present invention may be used in a variety of different devices to retain one member from axial movement relative to another member. The retaining ring structure of the present invention is constructed such that a minimum of deformation of the member in which the retaining ring is located occurs, and yet the retaining ring structure is capable of resisting substantial forces tending to effect relative movement of the members.

Retaining rings under appreciable thrust load, tend to "dish" or tilt in the groove in which they are located. This can result in (1) plastic flow of the material of the member having the circumferential groove, (2) deformation of the retaining ring, and/or (3) the retaining ring being completely removed from the groove. Plastic flow of the material of the member having the groove results in a lip being produced on the edge of the retaining ring groove. Plastic flow of the groove wall may lead to failure of the assembly due to the inability of the retaining ring to resist the load, and/or the lip may make disassembly of the device in which the ring is used difficult.

Thus, one principal object of the present invention is to provide a retaining ring structure which minimizes the concentration of stresses normally occurring at the edge of the retaining ring groove, and distributes the load to regions better able to withstand such forces and without deformation of the edge of the retaining ring groove. Rather than bearing against the edge of the groove as is common with current retaining ring structures, the retaining ring structure of the present invention bears for the most part on the sidewall defining the groove at a region spaced from the circumferential edge of the groove.

Further, the ring structures of the present invention include means to minimize dishing or rocking of the ring in the groove and maximize the load bearing capacity of the ring without substantial deformation. This is accomplished by a structure which applies the thrust load to the ring in the groove at a location immediately adjacent the surface of the member having the groove. As a result, the forces acting to rock or dish the ring in the groove act through a minimum moment arm. Thus, for a given thrust load the tendency for the ring in the groove to rock or deform is minimized. The structure which accomplishes this is a ring segment which is associated with the ring segment located in the groove and applies the thrust load to the ring segment in the groove immediately adjacent the surface of the member in which the groove is located.

Further, in one embodiment means are provided to limit collapse of the retaining ring structure and unintentional disengagement of the ring structure from the groove. This is accomplished by a ring segment which has surfaces which abut when the ring segment in the groove circumferentially contracts to a predetermined extent. The abutting surfaces limit such contraction and thus reduce the possibility of unintentional removal of the ring structure from the groove.

A retaining ring structure of the present invention preferably comprises a pair of L-shaped ring segments in concentric and nested relationship with the outer apex of the inner ring segment located at or near the inner apex of the outer ring segment, or in other cases, with the outer apex of the outer ring segment located at or near the inner apex of the inner ring segment. This structure may be achieved in two ways; i.e., with two separate ring segments of L-shaped cross section nested on one another, or by means of a spiraliform structure having two L-shaped sector ring segments as overlapping convolutions and in nested relationship with a compound transition portion joining the inner and outer ring segments.

BRIEF DESCRIPTION OF THE DRAWINGS

Further features and advantages of the present invention will be apparent to those skilled in the art upon reference to the following description made with reference to the drawings wherein.

DETAILED DESCRIPTION OF THE DRAWINGS

Figure 1:
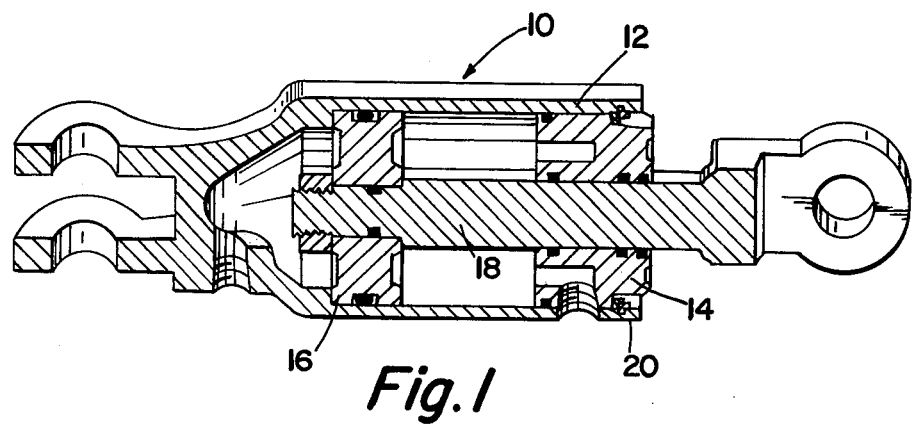
FIG. 1 is a sectional view of a hydraulic cylinder using a retaining ring structure of the present invention.

A preferred embodiment of the retaining ring structure of the present invention is shown in FIG. 1 as applied to a hydraulic cylinder 10. The hydraulic cylinder 10 includes a tubular member 12 and an end cap 14. A piston 16 moves within the hydraulic cylinder 10, and is connected to a piston rod 18 which extends through the end cap 14. When the piston 16 engages the end cap 14, a substantial thrust force is applied to the end cap 14 tending to move it relative to the tubular member 12. A retaining ring structure 20 in accordance with the present invention is utilized to prevent relative movement of the end cap 14 and the tubular member 12 due to the thrust force.

Figure 2:
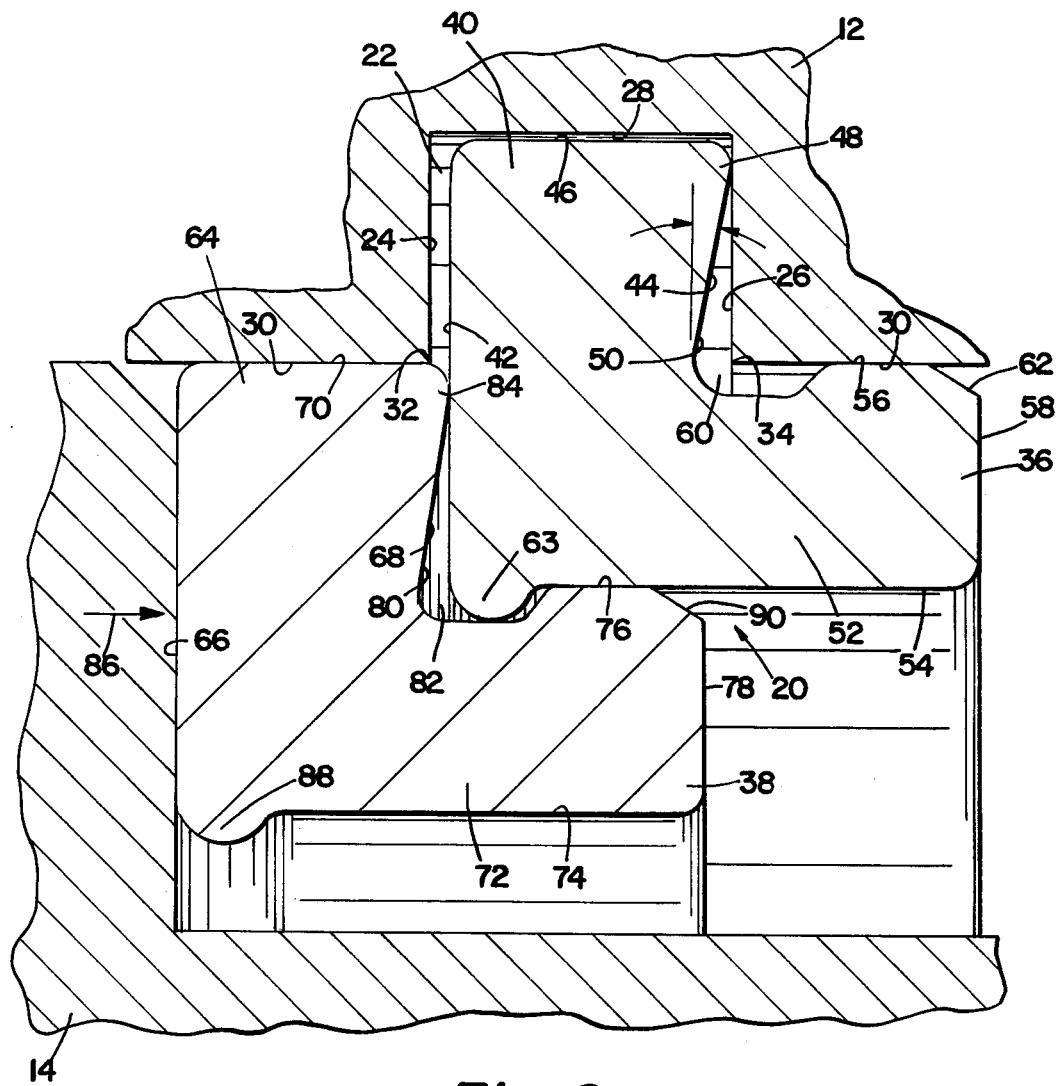
FIG. 2 is an enlarged cross sectional view of the retaining ring structure of FIG. 1 showing two ring segments forming the retaining ring structure.

FIG. 2 shows on a much enlarged scale a fragment of the tubular member 12, and a fragment of the end cap 14 with the retaining ring 20 coacting therebetween to restrain relative movement between the end cap 14 and the tubular member 12. As shown in FIG. 2 the tubular member 12 is provided with an annular groove 22 defined by parallel sidewalls 24 and 26, and a bottom wall 28 orthogonally related to the side walls. The tubular member 12 has an inner cylindrical wall 30. The intersection of the inner wall 30 and the sidewall 24 of the groove 22 is a groove circumferential marginal edge or corner 32. The intersection of the groove sidewall 26 with the inner surface 30 of the tubular member 12 is a circumferential marginal edge or corner 34. In the arrangement shown in FIG. 2, it is the corner 34 of a conventional retaining ring groove that becomes peened or swedged over due to dishing or rocking of the retaining ring as heavy axial loads are applied to the ring.

The retaining ring 20 is composed of two L-shaped ring segments 36 and 38 in concentric nested relationship. The L-shaped ring segment 36 as viewed in partial cross section in FIG. 2 is provided with a leg portion 40 which is dimensioned to fit relatively loosely within the groove 22. The leg portion 40 is defined by a rear wall 42, a front wall 44 and an axially extending surface 46.

The retaining ring member 36 is also provided with a foot portion 52 which is defined by a bottom surface 54, a top surface 56 and an end surface 58. In the embodiment shown in FIG. 2, these surfaces are orthogonally related one to the other.

The axial surface 46 may be seated against the bottom 28 of the groove 22, or spaced therefrom. Generally, the clearances desired in practice are from 0.000" to 0.020", and preferably 0.010". The front sidewall 44 of the leg portion 40 has an abutment portion 48 for engagement with the sidewall 26 of the groove 22 adacent the bottom 28 of the groove. A recessed portion 50 of the front sidewall 44 is raked inwardly of the leg portion 40 and away from the groove sidewall 26. In the embodiment shown in FIG. 2, the slope is at an angle of about 10° to the vertical. Undercutting of the leg portion 40 has been found to be especially useful in minimizing the wear on the circumferential marginal edge 34 of the groove 26 as the member 14 applies an axial load to the retaining ring assembly 20.

In the preferred structure illustrated in FIG. 2, the front portion 44 of the leg portion 40 lies along a straight line, and the upper surface 56 of the foot portion 52 also lies along a straight line as shown in the cross section. These lines define an angle at the intersection thereof which is less than 90°, but not less than about 60°, preferably they intersect at an angle of about 80° as shown in FIG. 2. The ring 36 is also provided with a circumferential recess 60 which also aids in creating a protective relief for the marginal edge 34 of the groove 22.

The upper radially extending surface 56 of the foot portion 52 is a load transmitting surface which is dimensioned for and located in abutting engagement with the inner surface 30 of the member 12. In practice, where the ring 36 is adapted to fit into an internal groove in a member such as the member 12, it is desirable that the outside diameter of the upper foot surface 56 be slightly larger than the internal diameter of the tubular member 12, e.g., 0.001" to 0.025" larger so that the member 12 exerts a radially inwardly compressive force on the ring member 36. Likewise, where the ring 36 is adapted to fit into an internal groove, the internal diameter of the surface 56 will be similarly desirably slightly smaller than the outside diameter of the tube.

A bevel portion 62 is provided extending between surfaces 56 and 58. Also as shown in FIG. 2, the portion of the ring 36 which corresponds to the heel is provided with a circumferentially extending bead 63.

As noted above, the retaining ring 20 includes a second or inner ring segment 38. The second ring segment 38 is in concentric nested relationship with the outer L-shaped ring segment 36, with the outer apex at the heel of the outer ring 36 located at the inner apex of the inner ring 38. The cross sections of the ring segments 36 and 38 are identical. The ring segment 38 is provided with a leg portion 64 having a radially extending rear surface 66, a front surface 68 and an axially extending upper surface 70 which is located in abutting engagement with the inner surface 30 of the tubular member 12. The rear wall 66 of the leg portion 64 provides an abutment surface for the end cap 14. In the same manner as the ring segment 36, the ring segment 38 is provided with a foot portion 72 which is defined by an axially extending surface 74, an upper axially extending surface 76 and a forward or toe surface 78. The surfaces 74, 76, and 78 are orthogonally related.

The ring segment 38 like its coacting member is also provided with a recessed front surface 80, and a circumferential recess 82. The recessed surface 80 on the front wall 68 serves the purpose of concentrating the axial force transmitted by the end cap 14 to the ring segment 36 through an abutment portion 84 of the ring segment 38. When the ring segments 36 and 38 are in nested relationship, the circumferential bead 63 of ring portion 36 is positioned within the recess 82 of the ring segment 38. Interference between the bead 63 and the recess 82 restrains separation of the ring segments 10 and 11 as the axial load is alternately released and applied to the end cap 14.

The portion of the ring segment 38 corresponding to the heel is also provided with a circumferential rim 88 and a bevel portion 90 at the toe of the foot portion 72. Thus, the cross sectional configurations of the ring segments 36 and 38 are identical, and the ring segments being otherwise identical are interchangeable in the preferred retaining ring structures of the present invention.

It will be observed, that as the member 16 moves axially to the right, within the tubular member 12, and engages the end cap 14, an axially directed load 86 is applied against the rear surface 66 of the ring segment 38. The retaining ring assembly 20 restrains relative axial movement between the members 14 and 12 in the direction of movement of the piston 16 to the right. Specifically, the thrust load 86 is transmitted by the ring segment 38 to the ring segment 36. The axial thrust load 86, at least in part, is transmitted through the abutment portion 84 to the ring segment 36. Any tendency of the ring segment 38 to tilt about abutment portion 84 results in a radial force being transmitted outwardly toward the bottom wall 28 of the groove 22 through the leg portion 40 due to the surface 76 contacting the surface 54. The major portion of this radial load being transmitted through the foot portion surface 56 to the sidewall surface 30 of the member 12.

The axial thrust component of the load applied by the member 14 is transmitted through the rear surface 66 of the ring segment 38 to the L-shaped ring segment 36 through the abutment surface 84. This force is transmitted through the ring segment 36 to the groove sidewall 26 through the abutment portion 48. It will be observed that the application of the axial thrust load through surface 84 is at a location closely adjacent the surface 30 of the member 12. This minimizes the moment arm through which the axial force is working on the second L-shaped ring segment 36 tending to tilt ring 36 about abutment surface 48 and tending to cause dishing of the ring member 36. A retaining ring structure of this invention maximizes the load bearing capacity of the rings hereof before deformation or "dishing" of the ring occurs. Further any tendency of the ring 36 to tilt about abutment portion 48 as a result of axial loading is resisted by engagement of surface 56 with inner surface 30 of the member 12.

Also it should be apparent that the ring segment 36 does not engage the edge 34 of the groove 22. Thus, the ring structure 20 does not peen over or form a lip on the edge 34 which has occurred with prior art retaining ring structures.

Figure 3:
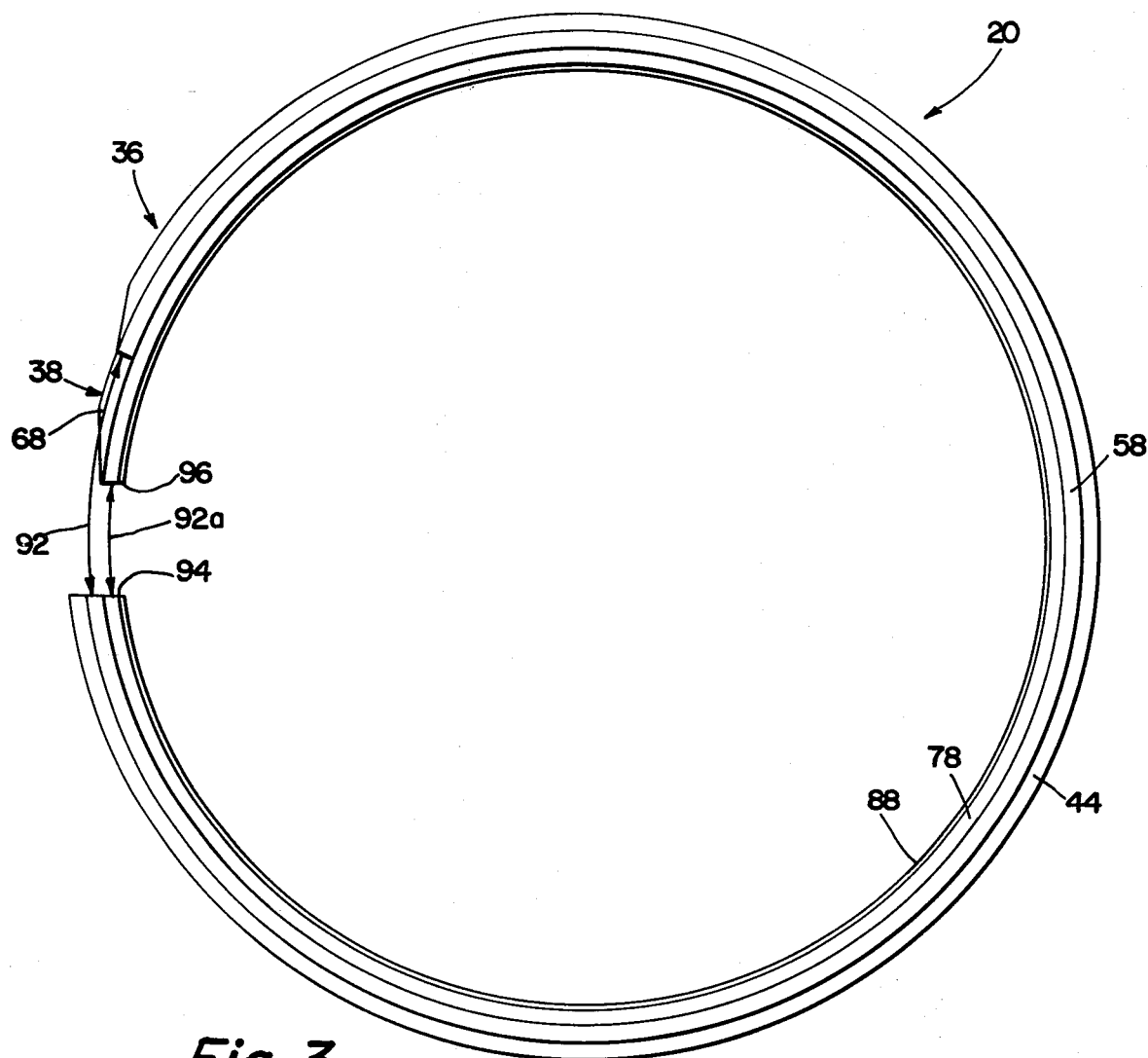
FIG. 3 is a schematic plan view of the retaining ring structure of FIG. 1.
Figure 4:
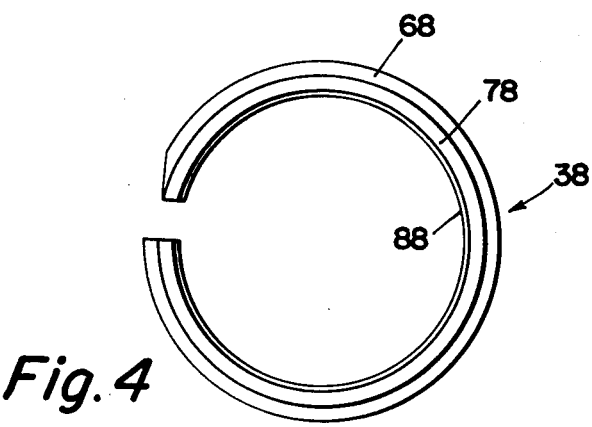
FIG. 4 is a schematic plan view of a single retaining ring sector forming a part of the structure of FIG. 1.

FIG. 3 shows in plan view the pair of ring segments 36, 38 in nested relation. Certain surface portions are omitted for purposes of clarity. FIG. 4 is a plan view of a ring segment similar to ring segment 38 before assembly with a ring similar to ring segment 36.

Each of the ring segments has a gap between the ends of the ring segments. The gap for the ring segment 36 is designated 92 and the gap for the ring segment 38 is designated 92a in FIG. 3. Inasmuch as the ring segments 36 and 38 are of identical structure, material, and size, it will be appreciated that the inner ring segment 38 has its diameter reduced when assembled with the outer ring segment 36 as shown in FIG. 3. Thus, the gap 92a is less than the gap 92.

The retaining ring assembly 20 may be assembled into the groove 22 in two different ways. First, the retaining rings 36 and 38 may be assembled together. The assembly may then be contracted diametrically and inserted into the tubular member 12 and allowed to expand into the groove 22. Thus, the inner sector ring portion 38 acts also as an expander ring for the outer sector ring portion 36 and thus will urge the leg portion 40 into the groove 22 in the surface 30 of the tubular member 12.

The second way in which the retaining ring assembly 22 may be assembled in the tube 12 is the ring 38 may be located within the tubular member 12 separately and spaced away from the groove 22. The ring 36 may then be contracted and placed within the tubular member and allowed to expand into the groove 22. The ring segment 38 is then moved toward the ring segment 36 by movement of the end cap toward the ring segment 36. The movement of the ring 38 results in the beveled surface 90 engaging the heel 63 of the ring segment 36, causing by a camming action a contraction of the ring segment 38 and a movement of the retaining ring 38 into the assembled relationship with the ring segment 36. When the rings are assembled in this manner, the gap 92a for the ring 38 may be sized so that the ends 94, 96 of the ring 38 positively engage before the retaining ring 36 can contract sufficiently to become removed from the groove 22. More specifically, if the ring 36 tends to dish or collapse, causing a collapse or contraction of the ring 38, the ends 94, 96 of the ring 38 will positively engage before the leg portion 40 becomes disengaged from the groove 22. This provides an anti-collapse feature for the two member rings in nested relation so that under extreme axial thrust loading, ring collapse and unintentional disengagement of the ring assembly from the groove is prevented.

As indicated above, an interlock between the bead 63 and the recess 82 of the contiguous ring segment 38 restrains the nested ring segments against separation due to reverse axial forces which may be occasioned by the application and release of heavy axial loads. The interlock also resists separation because of relatively light reverse thrust loads which may occur in systems with which the retaining rings of the present invention are mechanically associated.

Figure 5:
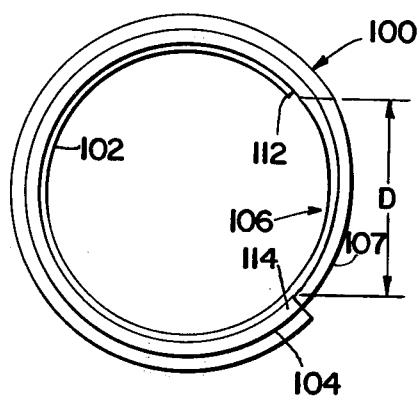
FIG. 5 is a plan view of a modified retaining ring structure embodying the present invention.
Figure 6:
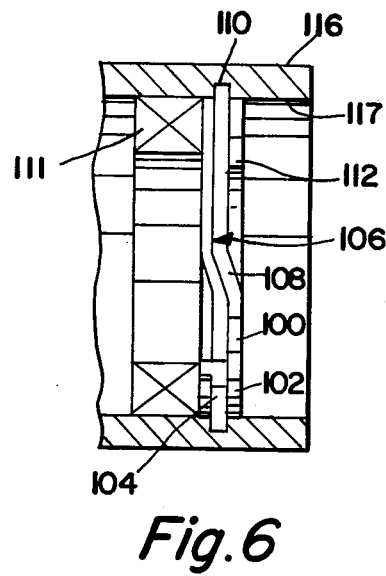
FIG. 6 is a view showing the retaining ring structure of FIG. 5 in the I.D. of a member.

Referring now to FIGS. 5 and 6, there is here schematically shown another form of a retaining ring structure of the present invention. The retaining ring structure is designated 100 and prevents axial movement of a bearing 111 with respect to a sleeve 116 in a direction to the right in FIG. 6. This ring structure 100 is adapted for placement on the I.D. of the circular tube or sleeve 116. In FIGS. 5 and 6, the retaining ring structure 100 is in the form of a spiral; that is, a continuous strip of metal of L-shaped configuration in cross-section such as shown in FIG. 2. A cross of the retaining ring structure of FIGS. 5 and 6 would be identical to FIG. 2 and therefore has not been shown. The ring structure 100 has two ring segments 102 and 104 in concentric nested relationship in the same manner as indicated above in FIG. 2. A compound transition portion 106 is provided whereby the outer convolution 104 of the spiraliform ring 100 now becomes the inner convolution corresponding to the ring segment 102. The transition zone 106 is displaced out of the normal plane of the ring segments 102, 104 as shown at 108. Inasmuch as a circumferential groove 110 in FIG. 6 cannot receive such a transition portion, the circular configuration of the retaining ring 100 must in the zone of the compound transition 106 be displaced radially inwardly to follow a chord of a circle as indicated at 107. To accommodate radial compression of the ring into a smaller periphery for insertion into the groove 110 of the tube 116, the starting end 112 of the first convolution 102 is spaced a circumferential distance D from the end 114 of the second convolution 104. The ends 112 and 114, it will be observed, are within the ring segments which are not distorted for either the transition 108 or the chord portion 107. Thus, the ends 112 and 114 are enabled relatively easily to be compressed circumferentially toward each other, and to expand to their maximum extent as limited by the inner sidewall of the tube 116. The retaining ring structure 100 will function as described above in connection with FIG. 2 except the retaining ring structure 100 does not have an anti-collapse function due to the ends of a ring segment coming into abutting relationship, as described above in connection with FIG. 3.

Figure 7:
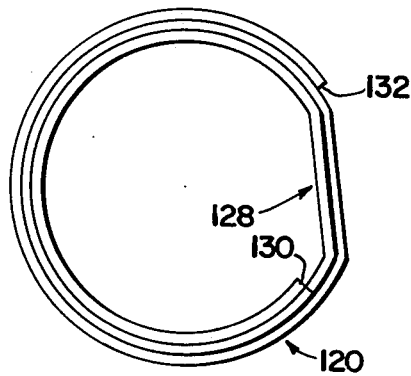
FIG. 7 is a plan view of another retaining ring structure embodying the present invention.
Figure 8:
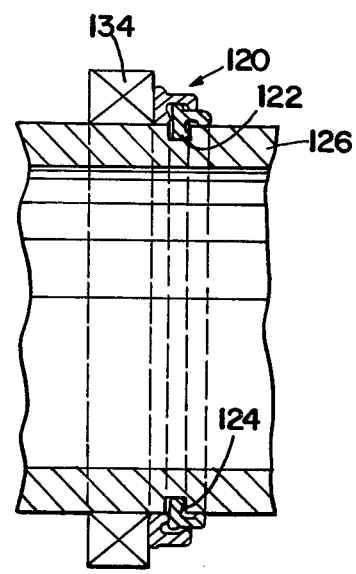
FIG. 8 is a view showing the retaining ring structure of FIG. 7 on the O.D. of a member.

Referring now to FIGS. 7 and 8, there is here again schematically shown a spiraliform retaining ring 120 similar to that shown in FIG. 5 with the exception that the groove engaging leg portion 122 is now located on the inside of the ring instead of on the outside as shown in FIG. 5. The retaining ring shown in FIGS. 7 and 8 is adapted to be inserted into a groove 124 on the O.D. of a member 126 as shown in FIG. 8. FIG. 8 shows the ring of FIG. 7 in cross-section. Whether the groove-engaging leg portion 122 is external or internal depends upon the direction in which the L-shaped metal strip is bent to form the sector ring portions. As shown in FIG. 8 the cross-sectional configuration is like that of FIG. 2 with the exception that the groove engaging leg portion 122 is at the inner circumference of the ring. There is a compound transition zone 128 as in FIG. 5, and the free ends 130 and 132 can be spread circumferentially away from each other to expand the rinfg to fit over the sleeve 126 until it snaps into the groove 122. This assembly can also be used to retain a bearing 134 against axial movement relative to the sleeve 126.

These L-shaped ring segments can be formed by conventional means, e.g., rolling from a strip of metal, the shaped metal then being bent about a mandrel to form a helical slinky. To form the retaining ring members of FIG. 1, every convolution in the slinky may be cut transversely to free individual ring segments. The ends of the individual ring segments may then be finished as shown in FIG. 3. If alternate convolutions of the slinky are cut, there are obtained spiraliform retaining ring members in which the transition zone 50 and the chordal configuration 107 thereof may be formed subsequently by known metal forming methods, and the convolutions brought into nested relationship. The ring members may then be hardened by known procedures.

What is claimed is:

1. A retaining ring adapted to be located in a circumferential groove in a first member and engage a second member to restrain relative axial movement of said members in one direction, said retaining ring comprising a ring segment having an L-shaped cross-section including a leg portion and a foot portion, the leg portion of said ring segment being for location in the groove of the first member and the foot portion of said ring segment having a surface for engaging with the first member near the groove, said leg having one surface for receiving a thrust load from one member and another surface for transmitting the thrust load to the other member, and said another surface having a circumferentially extending abutment surface portion for engaging a side surface defining the groove and a circumferentially extending recessed surface portion for confronting said side surface of said groove adjacent the foot portion for location in spaced relation to the edge of the groove.

2. A retaining ring adapted to be located in a circumferential groove in a first member and engage a second member to restrain relative axial movement of said members in one direction, said retaining ring comprising a ring segment having an L-shaped cross-section including a leg portion and a foot portion, the leg portion of said ring segment being for location in the groove of the first member and the foot portion of said ring segment having a surface for engaging with the first member near the groove, said leg having one surface for receiving a thrust load from one member and another surface for transmitting the thrust load to the other member, and said another surface having a circumferentially extending abutment surface portion for engaging a side surface defining the groove and a circumferentially extending recessed surface portion for confronting said side surface of said groove adjacent the foot portion for location in spaced relation to the edge of the groove, said retaining ring further including means for minimizing deformation of said L-shaped ring segment in the groove by applying axial thrust forces to said one surface only at a location immediately adjacent the first member.

3. A retaining ring in accordance with claim 2 wherein said means for minimizing deformation comprises a second L-shaped ring segment for location in nested relation with said first mentioned L-shaped ring segment, said second L-shaped ring segment having a surface which engages said one surface of said leg portion of said first mentioned L-shaped ring segment only at a location immediately adjacent the first member.

4. A retaining ring in accordance with claim 3 wherein said first and second L-shaped ring segments have the same cross-sectional configuration.

5. A retaining ring in accordance with claim 3 wherein the first and second L-shaped ring segments are first and second convolutions of a spiraliform strip of L-shaped cross-section, said ring including a compound transition portion between said convolutions, said transition portion being radially displaced out of the circular path of said groove to eliminate interference therewith.

6. A retaining ring in accordance with claim 3 wherein the first and second L-shaped ring segments are first and second separate split rings of L-shaped cross-section.

7. A retaining ring in accordance with claim 3 including means coacting between said first and second L-shaped ring segments when in nested relation for preventing relative axial movement between said first and second L-shaped ring segments, said means for preventing relative axial movement including a radially extending peripheral bead on one ring segment and a radially opposed groove located to receive said bead on the other ring segment, whereby when the ring segments are nested together interference between said bead and said groove resists axial separation of said segments.

8. A retaining ring adapted to be located in a circumferential groove in a first cylindrical member and engage a second member to restrain relative axial movement of said members in one direction, said retaining ring comprising a first portion having an L-shaped cross-section, said L-shaped cross-section comprising a leg portion and a foot portion, said leg portion being for disposition within the circumferential groove in said first member, said foot portion having a circumferential peripheral surface for engagement with the surface of said first member adjacent the groove, and means for preventing contraction of said first portion and unintentional disengagement thereof from the groove under axial thrust loading between said first and second members, said means comprising a second portion located in concentric nested relation with said first portion and which has surfaces which abut in response to circumferential contraction of said first portion to limit said circumferential contraction whereby said leg portion is retained in said circumferential groove against unintentional disengagement therefrom.

9. A retaining ring in accordance with claim 8 wherein said first and second portions are first and second circumferentially contractable nested split rings.

10. A retaining ring in accordance with claim 9 wherein said second nested ring has confronting ends which are spaced and move into abutment under a predetermined thrust loading to limit circumferential contraction of said first ring to prevent collapse and unintentional disengagement of said first ring from the circumferential groove.

11. A retaining ring in accordance with claim 10 wherein said second ring is for assembly with said members and said first ring is then located with said leg portion thereof in the groove and said second ring has a cam surface which engages a surface on said first ring when said members are moved axially to effect said nested relationship of said rings.

12. A retaining ring comprising a ring segment adapted to be located in a circumferential groove in a wall of a member, said ring segment having an L-shaped cross-section, said L-shaped cross-section including a leg portion having front and rear surfaces and a foot portion having a top surface for engagement with the wall of the member adjacent the groove, said leg portion terminating at its free end in an axial surface for disposition within the circumferential groove in the member, and means for applying axial thrust loads to said leg portion only at a location immediately adjacent the wall of the member.

13. A retaining ring in accordance with claim 12 wherein said means for applying axial thrust loads comprises another L-shaped ring segment located in nested relation with said first mentioned L-shaped ring segment and said second L-shaped ring segment has a surface which engages said leg portion of said first L-shaped ring segment only at a location immediately adjacent the wall of the member.

14. A retaining ring in accordance with claim 13 wherein said other L-shaped ring segment is defined in cross-section by a leg portion having front and rear surfaces and a foot portion having a top surface, the leg portion of said other ring segment terminating at its free end in an axially extending surface for location in abutment with the wall of said member adjacent the groove therein, the front surface of said leg portion of said other ring segment having a circumferentially extending abutment surface for engaging the rear surface of said leg portion of said first ring segment at a location immediately adjacent the wall of the member and a circumferentially extending recessed surface portion adjacent the foot portion for location in spaced relation to the rear surface of the leg portion of said first ring segment.

15. A retaining ring comprising a ring segment having an L-shaped cross-section including a leg portion and a foot portion, said leg portion of said ring segment extending radially from said foot portion, said foot portion of said ring segment extending axially from said leg portion, said leg portion including an outer axially facing surface on the outside of said L-shaped cross-section for receiving a thrust load and an inner axially facing surface on the inside of said L-shaped cross-section having a first surface portion for transmitting a thrust load and a second surface portion recessed toward said outer axially facing surface on the outside of said L-shaped cross-section, said leg portion and said foot portion intersecting at an outer vertex, said outer vertex being spaced radially and axially from said inner surface in a direction toward said outer axially facing surface.

16. A retaining ring in accordance with claim 15 wherein said leg portion extends radially outwardly from said foot portion.

17. A retaining ring in accordance with claim 1 wherein said leg portion extends radially inwardly from said foot portion.

18. A retaining ring adapted to be located in a circumferential groove in a first member and engage a second member to restrain relative axial movement of said members in one direction, said retaining ring comprising a ring segment having an L-shaped cross-section including a leg portion and a foot portion, the leg portion of said ring segment being for location in the groove of the first member and the foot portion of said ring segment having a surface for engaging with the first member near the groove, said leg having one surface for receiving a thrust load from one member and another surface for transmitting the thrust load to the other member, said another surface having a circumferentially extending abutment surface portion for engaging a side surface defining the groove and including a conical surface portion adjacent the foot portion for extending at an angle to the sidewall of the groove as said another surface extends from said abutment surface portion toward said foot portion for location in spaced relation to the edge of the groove.

19. A retaining ring in accordance with claim 1 wherein said surface on said foot portion for engaging said first member near the groove includes an abutment surface portion adjacent the distal end of said foot portion and a circumferentially extending recessed surface portion adjacent the proximal end of said foot portion and said leg portion for location in spaced relation to the edge of the groove.

* * * * *